UNITED STATES PATENT OFFICE.

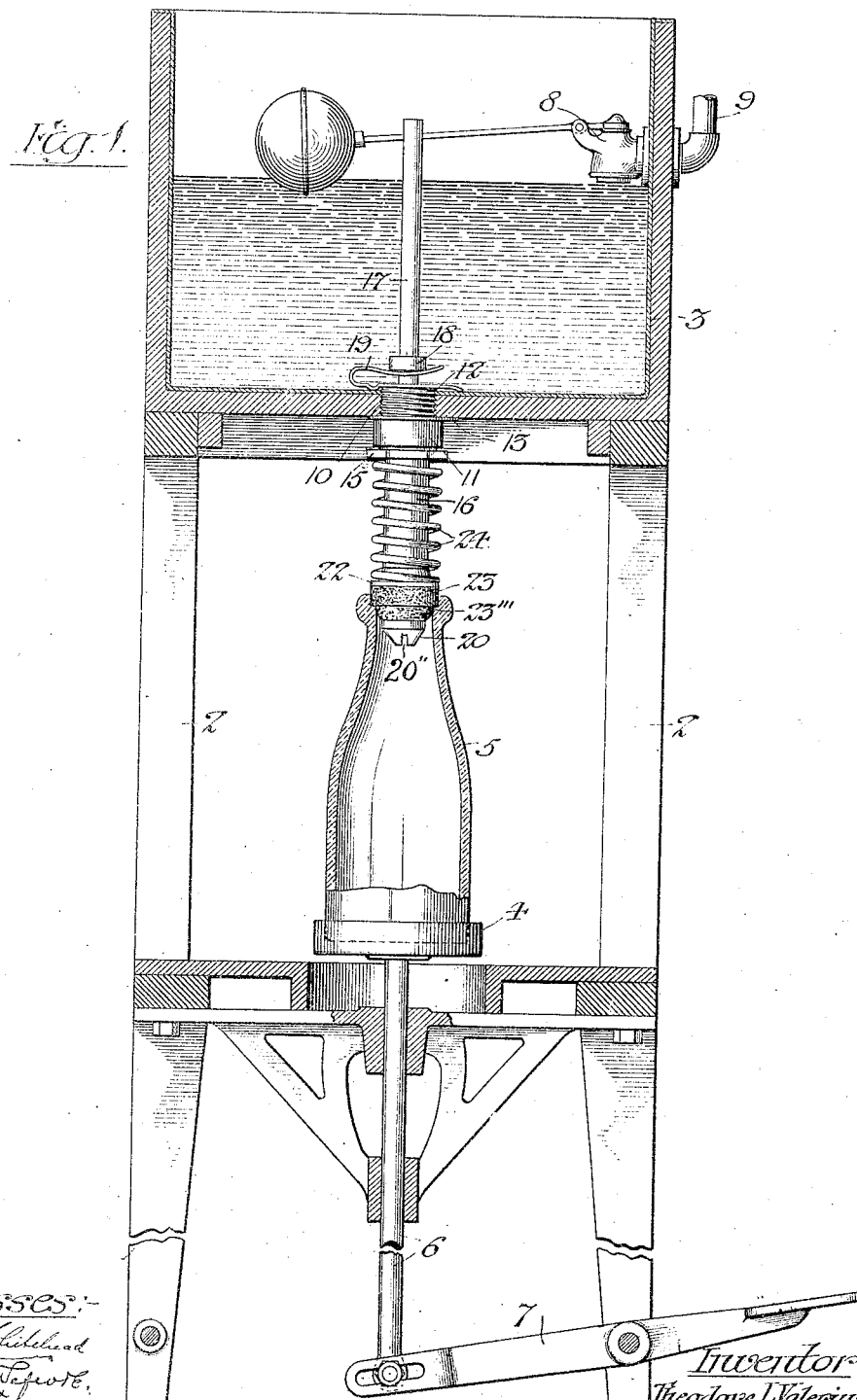

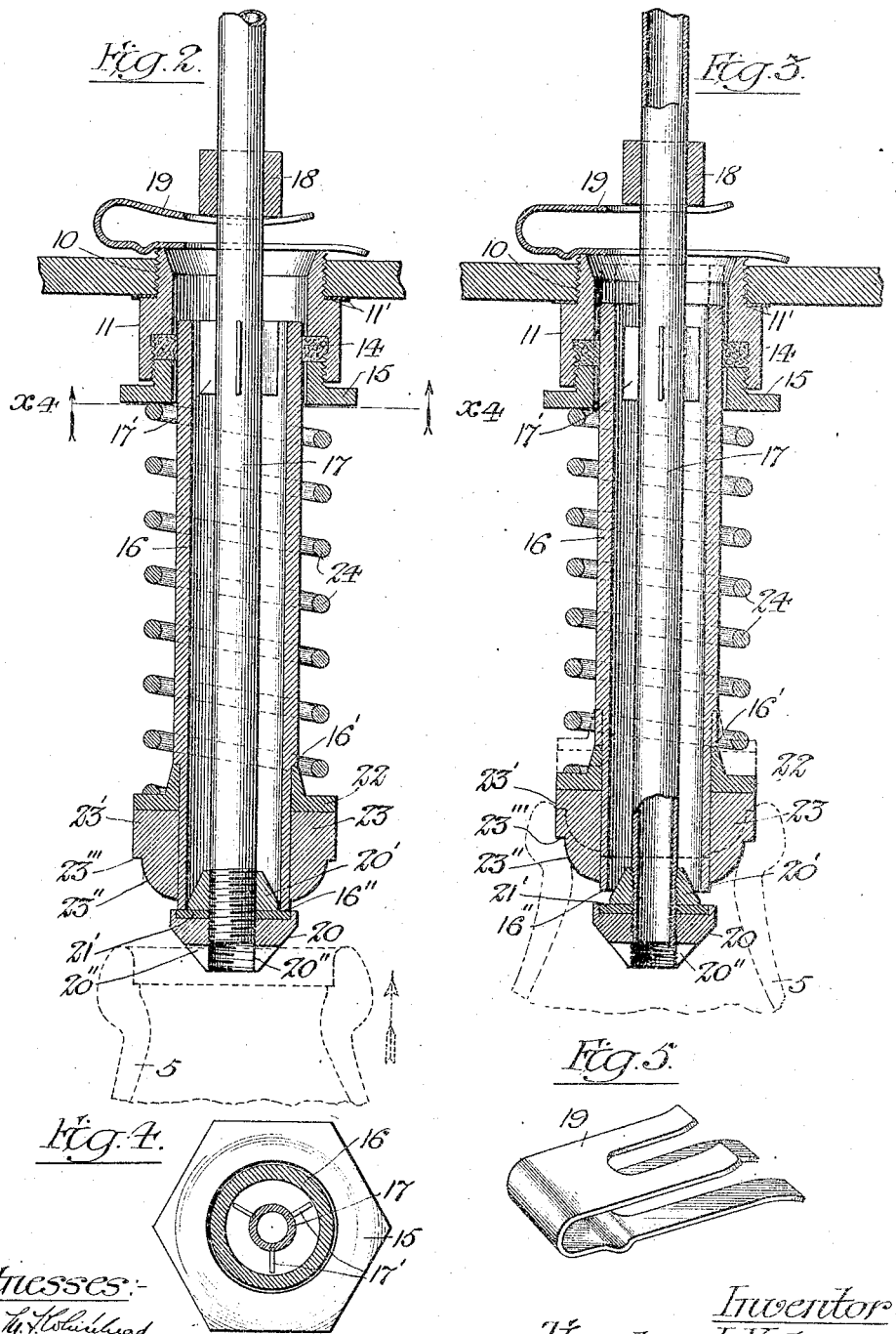

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

BOTTLE-FILLER.

No. 888,769.     Specification of Letters Patent.     Patented May 26, 1908.

Application filed November 14, 1904. Serial No. 232,753.

*To all whom it may concern:*

Be it known that I, THEODORE L. VALERIUS, a citizen of the United States, and a resident of Fort Atkinson, Jefferson county, Wisconsin, have invented a certain new, useful, and Improved Bottle-Filler, of which the following is a specification.

My invention relates to an apparatus for filling bottles, and has special reference to improvements in machines for filling those which have large mouths such as milk and cream bottles.

The invention relates particularly to an improved bottle filler nozzle or valve.

From a practical, commercial standpoint, the problem of providing for the rapid, economical filling of milk and cream bottles preparatory to their delivery to customers, is a serious one. To be adequate and successful, any machine which is designed for this work must be capable of filling a very large number of bottles within the brief period that elapses between the receipt of the milk in cans at the bottling station and the shipment or delivery of the bottled milk. Furthermore, the machine must be capable of easy operation, and in addition to being thoroughly sanitary, should operate without waste of milk and without making it necessary to wash the bottles after they are filled and capped.

The object of my invention is to provide a bottle filling machine which shall meet the foregoing requirements.

The special objects of the invention include the following:—To provide an improved bottle filler valve which shall operate without waste or overflow of liquid;—which will deliver milk or cream into the bottle in such manner as to prevent excessive frothing within the bottle;—which may be easily taken apart and will meet all sanitary requirements;—which shall be self-adjusting with respect to the position of bottle placed beneath it;—which may be attached to the reservoir of almost any bottle filling machine;—which shall be of simple construction and low cost;—and, which shall be so constructed that it will tightly close the top or mouth of every bottle, even though the latter be broken or chipped.

Other objects of my invention will appear hereinafter.

Briefly defined, my invention consists in a bottle filler valve, comprising a closure-bearing tube that is slidably connected to a liquid reservoir, in combination with a spring or weight which normally projects the tube and a vent pipe, suitably supported with relation to the reservoir and having at its lower end a valve adapted to close the first mentioned tube; and, further my invention consists in various constructions, arrangements and combinations of parts, all as hereinafter described and particularly pointed out in the claims.

I declare the following to be a full, clear and exact description of my invention such as will enable others skilled in the art to make and use the same, reference being made to the accompanying drawings which form a part of this specification.

In said drawings Figure 1 is a sectional elevation of a typical bottle filling machine embodying my invention. Fig. 2 is an enlarged sectional view of my improved bottle filler valve. Fig. 3 is a similar view, showing the valve proper open. Fig. 4 is a sectional view on the line $x^4$—$x^4$ of Fig. 2, and Fig. 5 is a perspective view of a spring clip which I prefer to use for supporting the several parts of the valve.

Referring now to the drawings, in which like reference numerals designate the same parts in the different views, 2 represents a suitable frame, adapted to support the liquid reservoir, 3. In the lower part of the frame is a vertically movable plate, 4, to receive a milk bottle, 5. This plate is operated by means of the rod, 6, and pedal, 7. For the purpose of keeping the liquid at a given height in the reservoir, I use a float-valve, 8, which controls the flow of milk from the supply pipe or connection, 9, supposed to be connected with a larger reservoir or vat. The reservoir is usually a metal vessel, lined with tin and its bottom is provided with a threaded opening, 10, to receive a packing box or packed guide. This box has a threaded portion, 12 screwed into the hole, 10, with suitable packing, 13, between the bottom of the reservoir and the shoulder, 11', on the box. The lower end of the box, 11, contains a recess to receive a packing ring, 14, and a screw gland, 15, by which the packing may be tightened. If desired, a flexible ring may be placed in a simple groove in the box walls. The upper end of the packing box preferably extends slightly above the inner bottom of the reservoir as shown in Figs. 2 and 3. Thus constructed and attached to the bottom of the reservoir, the box 11 holds and guides the upper end of the liquid conduit nozzle, or valve-tube, 16. This tube is of considerably less diameter than the packing-box and may therefore oscillate therein. Obviously the joint between the slidable tube, 16, and the stuffing-box, 11, is made tight by the compressed packing-ring, 14; and yet the tube is adapted to slide or telescope freely in the stuffing-box. The upper edges of the tube, 16, are slightly rounded or beveled to permit its easy insertion into the stuffing-box.

Centered within the liquid tube, 16, by wings, 17', is a smaller air-vent pipe, 17, provided with a shoulder or collar, 18, and supported by a readily removable clip, 19, resting upon the upper end of the packing box, in other words upon the bottom of the reservoir. At the lower end of the tube, 17, is a valve-disk, comprising large and small threaded nuts, 20—20', screwed upon the end of the tube, 17, and holding a flexible disk or washer, 21'. The larger nut has its upper surface recessed to receive the flexible or compressible washer, which latter constitutes the valve-seat.

The units or valve parts are conical and the lower one preferably has one or more notches, 20'', to facilitate the escape of air when a bottle is nearly full. The lower end of the valve-tube, 16, normally rests upon the packing in the top of the valve part 20. The lower part of the tube 16, is reduced in diameter to provide a thin edge or valve-seat, 16'', therefor, and also a shoulder, 16'. A disk or ring, 22, is driven onto the reduced end of the tube, 16, against the shoulder, 16', thereof, after which the tube is ready to receive the flexible, usually rubber, bottle closure or stopper, 23. This part is a ring, of peculiar cross-section, which fits snugly upon the lower end of the tube, 16, and against the under surface of the disk, 22.

The upper portion, 23', of the stopper or closure, is substantially cylindrical in shape, and its diameter is substantially that of the upper part of a milk bottle neck. The lower part of the closure, 23'', is of less diameter than the cylindrical part and is substantially hemispherical in shape to fit snugly in the neck of the bottle. This construction affords a shoulder, 23''', which is adapted to engage with the internal shoulder or cap-seat of the bottle neck. This shoulder, 23'''', to a greater extent than either the cylindrical or spherical portions of the closure, is depended upon to tightly close the top or mouth of the bottle, and it should be here noted that the bottle mouth will be perfectly closed thereby, even though the mouth of the bottle has been broken or chipped. I regard this feature of my invention as of much importance, as in every large lot of bottles many are found that contain nicks or notches, which would not be closed by a device simply resting upon the top of the bottle neck. The spherical or conical portion of the closure though fitted to the bottle neck is chiefly useful in guiding the valve into the neck of the bottle. In this regard my peculiar closure, 23, is assisted by the conical disk-valve part, 20, which practically forms an extension of the spherical portion of the compressible closure. The tube, 16, is surrounded by a spiral spring, 24, the ends of which bear against the gland, 15, and the follower, 22, so that the spring constantly tends to project the tube from the stuffing box, but is prevented from so-doing by the vent-tube which is attached to the reservoir.

The maximum movement of the tube, 16, with respect to the valve part, 20, is determined by the distance between the upper end of the tube, 16, and the clip, 19. If the tube, 16, is excessively elevated, its upper end will engage and lift the clip, and therewith the vent-tube, 17, and valve part, 20. In some machines where I find it necessary to make the packing of the stuffing box longer than here shown in which the tube, 16, would never engage the supporting clip, I provide a limiting stop on the vent-tube, to be engaged by the tube, 16. The clip, 19, which supports the several parts of the device, is preferably a spring of substantially the same or less strength than the spring, 24, and when such a cushion or spring clip is used, it serves to relieve the valve-seat, 21', from the force of the blow of the valve-tube, when the latter is reseated after being raised. Normally the parts of the device are held together and supported by the clip, 19. When it is desired to take the valve apart to clean or repair it, the clip, 19, is pulled out; whereupon the tube, 17, and the tube, 16, will drop, down, out of the stuffing box. Thus the extraction of the clip, 19, is the only movement that is required of the operation, in order to completely dismember the valve and prepare the parts to be separately washed and wiped. These valves are commonly used in groups of twelve or more upon a single bottle filling machine and the ease with which they may be either dismembered or assembled and put in place, adds greatly to their value, insuring a great saving of time and effort on the part of the operators.

It will be understood that my valve may be employed in any machine wherein the valve and the bottle are moved toward and from each other, whether the valve is lowered into contact with the bottle, or the bottle raised, as in the machine herein illustrated. This being understood, the operation of my invention as herein embodied may be described as follows. In Fig. 1 of the drawings, the bottle and the several parts of the machine are shown as they would appear at either moment of initial or final engagement of valve and bottle. The bottle is first placed upon the plate, 4, at that time in its depressed position. The operator then steps upon the treadle, 7, and thereby elevates the bottle. The bottle may or may not be exactly central with respect to the valve, in either case, the conical end of the valve, comprising the cone-shaped metal and flexible portions, 20', and 23'', will serve to center the bottle neck upon the closure or stopper, 23'', and, force the shoulder of the bottle mouth squarely against the shoulder, 23''', of the closure. During this movement, the spring, 24, resists the upward thrust of the bottle, but upon further movement of the treadle, the bottle operates to lift the closure, 23, and the tube, 16, against the pressure of the spring, 24. Meantime, save for its slight, if any, elevation by the spring clip, 19, the tube, 17, and the valve part, 20, remain stationary, hence the vertical movement of the liquid tube or nozzle, 16, opens the lower end of said tube, and allows the liquid from the reservoir to flow into the bottle. Because of the shape of the liquid valve part, 20, the milk which emerges from the tube, 16, is directed against the inner walls of the bottle, and in this way the trapping of the air in the bottle is prevented and the body of air occupying the central portion thereof, finds ready exit through the centrally disposed vent-tube, 17, which rises above the surface of the liquid in the reservoir. When the bottle has been filled with liquid and before the liquid has had time to rise within the vent-tube, the operator releases the treadle, and dropping the bottle, permits the lower end of tube, 16, to reseat itself upon the valve part, 20. The filled bottle is then removed and the operation repeated with an empty bottle. The only joints existing in my filler-valve are closed by the substantial and reliable packing rings or washers, 14 and 21', both of which are of very slight cost and which, when they become worn, may be quickly replaced by others. While the filler tube, 16, is tightly joined to the stuffing-box, 11, it is nevertheless permitted considerable movement therein because of its smaller diameter, and my filler-valve may therefore be described or qualified as "flexible" or as a valve which is flexibly jointed to the reservoir and hence adapted to adjust itself automatically to the differing positions of successive bottles. In this connection, it should be noted that the valve part, 20, is in effect pivotally suspended, and therefore is adapted to follow the oscillatory or gyratory movements of the tube, 16, and the closure.

As it is obvious that numerous modifications of my invention will readily suggest themselves to one skilled in the art, I do not confine the invention to the specific constructions herein shown and described.

Having thus described my invention, I claim as new and desire to secure by Letters Patent:

1. In a bottle filler, a reservoir, having an opening in its bottom, in combination with a vertical liquid tube having its upper end slidably arranged in said opening and in communication with the reservoir, a closure of flexible material on the lower end of said tube, a spring exerting downward thrust on said tube, a vent pipe arranged within said tube, a valve provided on the lower end of said pipe and normally closing the lower end of said tube, said valve being fixed on said pipe and said pipe being detachably engaged with and supported by said reservoir, substantially as described.

2. In a bottle filler, a reservoir, provided with a box or sleeve in its bottom, in combination with a liquid tube slidable in said box, means normally projecting said tube, a closure on the lower end of said tube and a suitably supported valve arranged at the lower end of the tube and normally closing and sustaining said tube, substantially as described.

3. In a bottle filler, a reservoir, provided with a box or sleeve in its bottom, in combination with a liquid tube slidably arranged in said box, a bottle closure or stopper at the lower end of said tube, means normally projecting said tube and a valve engaged by the lower end of said tube and normally sustaining said tube, said tube and valve being relatively movable, substantially as described and for the purpose specified.

4. In a bottle filler, a reservoir, provided with a box or sleeve in its bottom, in combination with a liquid tube slidably arranged in said box, a bottle closure or stopper at the lower end of said tube, means normally projecting said tube, a valve engaged by the lower end of said tube, and normally sustaining said tube, said tube and valve being relatively movable, and a suitable air vent, substantially as described and for the purpose specified.

5. In a bottle filler, a reservoir, in combination with a packing box upon the bottom of the reservoir, a packing ring therein and of less internal diameter, a liquid tube slidable within said ring and smaller than said box, a closure on said tube, means beneath the reservoir to depress the tube, a suitable vent pipe depending from said reservoir and a valve on the lower end of said pipe and closing said liquid tube, substantially as described.

6. In a bottle filler, a packing box, in combination with a liquid tube slidable in said box, suitable packing closing the joint between the box and the tube, a closure on said tube, a valve at the lower end of the tube, and removable part at the top of said box and means connecting said part and valve, to support said valve, said closure and said tube, the removal of said part serving to disconnect said valve, tube and box, substantially as described.

7. In a bottle filler valve, a packing box and a liquid tube slidably connected, in combination with a bottle closure on said tube, a vent-pipe within said tube, means substantially fixing said pipe with relation to said box, a tube closure, said means being removable to release said pipe and a spring to dismember the valve when said means is removed, substantially as described.

8. In a bottle filler valve, a reservoir packing box, in combination with a liquid tube of substantially the same diameter throughout and slidable in said box, a vent pipe arranged within said tube, and supported from said box, a valve disk having a packing recess, on the lower end of said pipe and flexible valve seat in said recess, to close against the end of said tube, substantially as described.

9. In a bottle filler valve, a reservoir-packing-box, in combination with a liquid tube slidable in said box, a bottle closure on said tube, a tube projecting spring, a vent pipe within said tube, a collar or shoulder on said pipe, a readily removable clip arranged between said shoulder and box, and a tube closure on the lower end of said pipe, substantially as described.

10. In a bottle filler valve, a packing box to be inserted in the bottom of a reservoir, in combination with a liquid tube of substantially the same diameter throughout and slidable in said box, a collar or disk arranged on said tube, a spring arranged upon the tube between said box and said disk, a bottle closure provided on the lower end of said tube beneath said disk, a vent pipe arranged within the tube and having a collar adjacent to said box, a stop or support for said collar and a tube closure provided upon the lower end of said vent pipe and serving as a stop for said tube, substantially as described.

11. In a bottle filler, a reservoir, in combination with a packing box arranged in the bottom thereof, a tube of considerably less diameter than said box but engaged by the packing therein, said tube being permitted both lateral and longitudinal movement in the box, a bottle closure on the lower end of said tube, a suitably supported vent pipe, a valve on the lower end thereof whereon the lower end of said tube normally rests and a spring forcing the tube downwardly against said valve, substantially as described.

In witness whereof, I have hereunto set my hand this 3rd day of November, 1904, at Chicago, Cook county, Illinois, in the presence of two witnesses.

THEODORE L. VALERIUS.

Witnesses:
CHARLES GILBERT HAWLEY,
CHARLES S. MURRAY.